United States Patent
Nichols et al.

(10) Patent No.: US 8,175,761 B2
(45) Date of Patent: May 8, 2012

(54) SYSTEM AND METHOD FOR RENDERING A SYNTHETIC PERSPECTIVE DISPLAY OF A DESIGNATED OBJECT OR LOCATION

(75) Inventors: Troy Nichols, Peoria, AZ (US); John G. Suddreth, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 584 days.

(21) Appl. No.: 12/372,567

(22) Filed: Feb. 17, 2009

(65) Prior Publication Data

US 2010/0211237 A1 Aug. 19, 2010

(51) Int. Cl.
G06F 19/00 (2011.01)
G06T 1/00 (2006.01)

(52) U.S. Cl. ............................. 701/14; 345/418
(58) Field of Classification Search .............. 701/14–18, 701/3, 4, 120; 340/945, 972
See application file for complete search history.

(56) References Cited

U.S. PATENT DOCUMENTS

| | | | | |
|---|---|---|---|---|
| 5,555,175 A | * | 9/1996 | D'orso | 701/5 |
| 6,822,624 B2 | * | 11/2004 | Naimer et al. | 345/9 |
| 7,295,901 B1 | * | 11/2007 | Little et al. | 701/16 |
| 2004/0041999 A1 | * | 3/2004 | Hogan et al. | 356/141.5 |
| 2007/0088491 A1 | * | 4/2007 | He | 701/120 |
| 2007/0171094 A1 | * | 7/2007 | Alter et al. | 340/970 |
| 2008/0158256 A1 | * | 7/2008 | Russell et al. | 345/629 |
| 2008/0262664 A1 | * | 10/2008 | Schnell et al. | 701/4 |
| 2009/0313566 A1 | * | 12/2009 | Vian et al. | 715/765 |

* cited by examiner

Primary Examiner — Thomas Black
Assistant Examiner — Marthe Marc-Coleman
(74) Attorney, Agent, or Firm — Ingrassia Fisher & Lorenz, P.C.

(57) ABSTRACT

A method for displaying information on a flight deck display element of an aircraft begins by obtaining a user interface command that represents a user-entered selection of a designated target. Relevant data is accessed and processed in response to this command, including aircraft status data for the aircraft, terrain data corresponding to terrain proximate the designated target, and graphics data corresponding to the designated target. Then, a target-focused display is rendered on the flight deck display element. The target-focused display includes a real-time synthetic perspective view of the designated target and the terrain proximate the designated target, wherein content of the target-focused display is influenced by the aircraft status data, the terrain data, and the graphics data.

20 Claims, 6 Drawing Sheets

SYSTEM AND METHOD FOR RENDERING A SYNTHETIC PERSPECTIVE DISPLAY OF A DESIGNATED OBJECT OR LOCATION

TECHNICAL FIELD

Embodiments of the subject matter described herein relate generally to avionics systems such as flight display systems. More particularly, embodiments of the subject matter relate to a flight deck display system that generates a synthetic perspective display that is focused on a selected object, target, or location, as viewed from a specified point of view.

BACKGROUND

Modern flight deck displays for vehicles (such as aircraft or spacecraft) display a considerable amount of information, such as vehicle position, speed, altitude, attitude, navigation, target, and terrain information. In the case of an aircraft, most modern displays additionally display a flight plan from different views, either a lateral view, a vertical view, or a perspective view, which can be displayed individually or simultaneously on the same display.

The lateral view, generally known as a lateral map display, is basically a top-view of the flight plan, and may include, for example, a top-view aircraft symbol, waypoint symbols, line segments that interconnect the waypoint symbols, and range rings. The lateral map may also include various map features including, for example, weather information, terrain information, political boundaries, and navigation aids. The terrain information may include situational awareness (SA) terrain, as well as terrain cautions and warnings which, among other things, may indicate terrain that may obstruct the current flight path of the aircraft. The perspective view provides a three-dimensional view of the vehicle flight plan and may include one or more of the above-mentioned features that are displayed on the lateral map, including the terrain information. In this regard, some modern flight deck display systems incorporate a synthetic terrain display, which generally represents a virtual or computer simulated view of terrain rendered in a conformal manner.

The primary perspective view used in existing synthetic vision systems emulates a forward-looking cockpit viewpoint. Such a view is intuitive and provides helpful visual information to the pilot and crew. However, a forward-looking view has limitations in that it may not always display the intended approach target or object of interest. For example, if the aircraft is approaching from the side of the destination airport and the pilot needs to turn the aircraft a significant amount for runway alignment, then the airport or the target runway might be out of the synthetic field of view. In reality, the pilot would be able to keep his eye on the airport by turning his head and viewing the airport through a side window. Using a synthetic or virtual display, however, the airport will momentarily move off the screen. Lack of target focus in this manner can be confusing and frustrating for pilots.

BRIEF SUMMARY

A flight deck display system for an aircraft is provided. The system includes a processor architecture and a display element coupled to the processor architecture. The processor architecture is configured to receive real-time aircraft status data for the aircraft and graphics data corresponding to a selected object/location, and is further configured to generate image rendering display commands that are influenced by the aircraft status data and the graphics data. The display element receives the image rendering display commands and, in response thereto, renders a real-time synthetic perspective view of the selected object/location corresponding to a designated viewpoint.

Also provided is a method for displaying information on a flight deck display element of an aircraft. The method involves receiving aircraft status data for the aircraft, receiving terrain data corresponding to terrain proximate the aircraft, and rendering, in response to the aircraft status data and the terrain data, a primary flight display on the flight deck display element. The primary flight display comprises a synthetic perspective view of terrain that is based on the terrain data, and the synthetic perspective view of terrain corresponds to a flight deck viewpoint. The method continues by rendering, in a portion of the primary flight display, a synthetic perspective view of a designated target.

A method for displaying information on a flight deck display element of an aircraft is also provided. The method begins by obtaining a user interface command that represents a user-entered selection of a designated target. The method continues by accessing aircraft status data for the aircraft, terrain data corresponding to terrain proximate the designated target, and graphics data corresponding to the designated target. The method then renders a target-focused display on the flight deck display element. The target-focused display includes a real-time synthetic perspective view of the designated target and the terrain proximate the designated target, wherein content of the target-focused display is influenced by the aircraft status data, the terrain data, and the graphics data.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
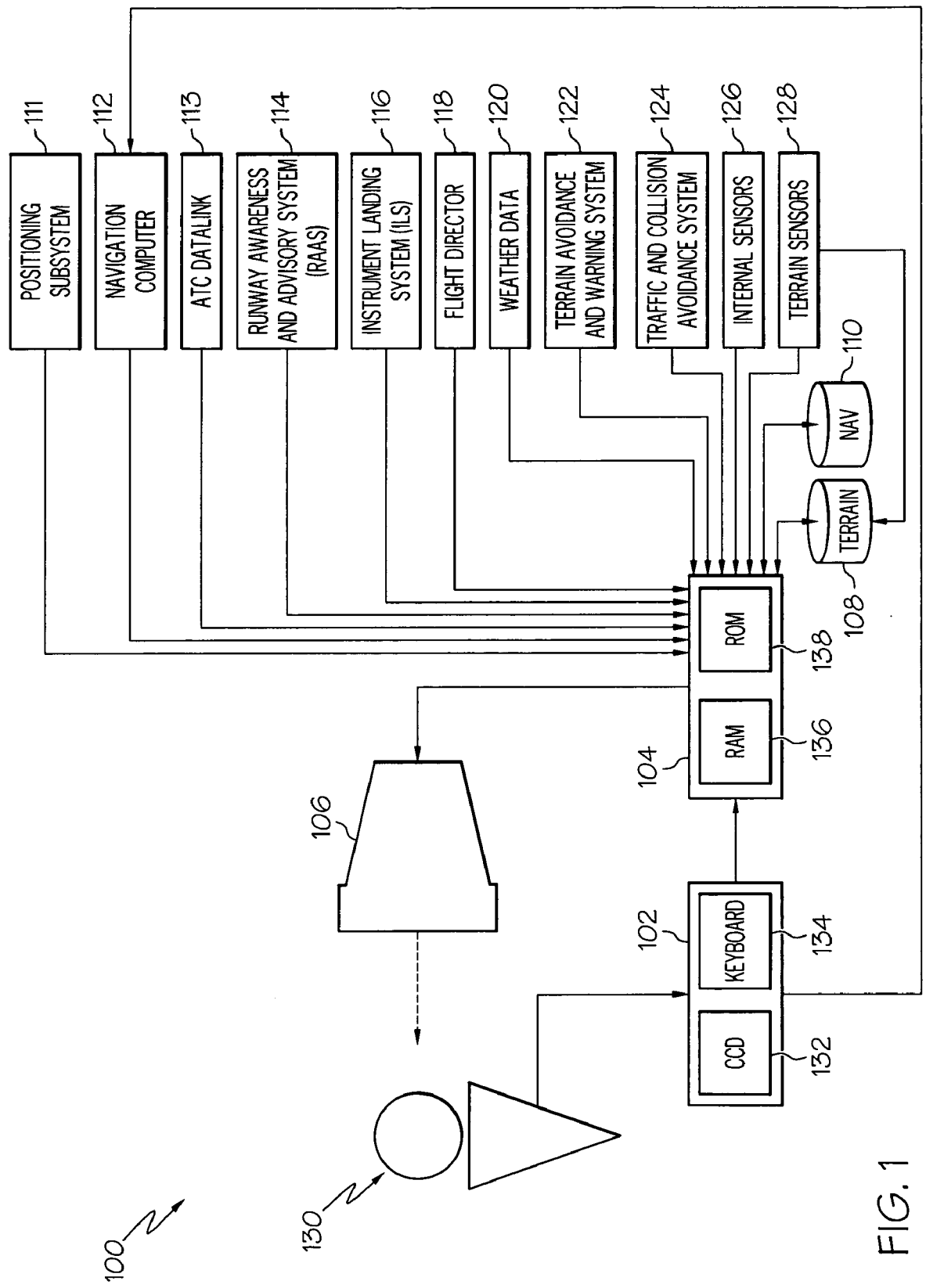
FIG. 1 is a schematic representation of an embodiment of a flight deck display system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

The subject matter described herein relates to a flight deck display element and related systems and operating methods. The flight deck display system includes a primary flight display that includes a synthetic perspective view of terrain as depicted from a forward-looking cockpit view. The flight deck display system also includes another display element, which may be incorporated into the primary flight display or rendered as a separate and distinct display. The other display element includes a synthetic perspective view of a designated or selected target (e.g., an object, a location, an airport, a waypoint, or the like) as viewed from a designated or selected point of view. Notably, the selected target remains displayed on this display element regardless of the position, flight status, or orientation of the host aircraft. In other words, the selected target remains focused or "locked in" on this display element. For example, the designated target object could be an airport or runway, and the display could render the airport/runway from the viewpoint of the host aircraft, thus keeping the airport/runway in focus and displayed at all times during approach. This could assist the pilot's situational awareness, and indicate to the pilot when to turn onto final approach based on the orientation of the runways.

As described in more detail below, the system could also allow the user to designate objects of interest such as air traffic (leveraging ADS-B technology), navigation aids, beacons, waypoints, or the like. The system could also be configured to display a manually selected heading and/or vertical view angle. Moreover, zooming and/or scrolling features could be implemented to provide a better view of objects of interest.

FIG. 1 depicts an exemplary flight deck display system 100 that generally includes, without limitation: a user interface 102; a processor architecture 104 coupled to user interface 102; and a display element 106 coupled to processor architecture 104. System 100 may also include, cooperate with, and/or communicate with a number of databases, sources of data, or the like. Moreover, system 100 may include, cooperate with, and/or communicate with a number of external subsystems as described in more detail below. For example, processor architecture 104 may cooperate with one or more of the following components, features, data sources, and subsystems, without limitation: one or more terrain databases 108; one or more navigation databases 110; a positioning subsystem 111; a navigation computer 112; an air traffic control (ATC) datalink 113; a runway awareness and advisory system (RAAS) 114; an instrument landing system (ILS) 116; a flight director 118; a source of weather data 120; a terrain avoidance and warning system (TAWS) 122; a traffic and collision avoidance system (TCAS) 124; one or more inertial sensors 126; and one or more terrain sensors 128.

User interface 102 is in operable communication with processor architecture 104 and is configured to receive input from a user 130 (e.g., a pilot) and, in response to the user input, supply command signals to processor architecture 104. User interface 102 may be any one, or combination, of various known user interface devices including, but not limited to, a cursor control device (CCD) 132, such as a mouse, a trackball, or joystick, one or more buttons, switches, or knobs. In the depicted embodiment, user interface 102 includes CCD 132 and a keyboard 134. The user 130 manipulates CCD 132 to, among other things, move cursor symbols that might be rendered at various times on display element 106, and the user 130 may manipulate keyboard 134 to, among other things, input textual data. As depicted in FIG. 1, user interface 102 may also be utilized to enable user interaction with navigation computer 112, the flight management system, and/or other features and components of the aircraft. More specifically, user interface 102 is preferably manipulated to select or identify a designated target, object, or location to be displayed in a target-focused manner on a synthetic perspective display (described in more detail below).

Processor architecture 104 may utilize one or more known general-purpose microprocessors or an application specific processor that operates in response to program instructions. In the depicted embodiment, processor architecture 104 includes or communicates with onboard RAM (random access memory) 136, and onboard ROM (read only memory) 138. The program instructions that control processor architecture 104 may be stored in either or both RAM 136 and ROM 138. For example, the operating system software may be stored in ROM 138, whereas various operating mode software routines and various operational parameters may be stored in RAM 136. It will be appreciated that this is merely exemplary of one scheme for storing operating system software and software routines, and that various other storage schemes may be implemented. It will also be appreciated that processor architecture 104 may be implemented using various other circuits, not just a programmable processor. For example, digital logic circuits and analog signal processing circuits could also be used.

Processor architecture 104 is in operable communication with terrain database 108, navigation database 110, and display element 106, and is coupled to receive various types of data, information, commands, signals, etc., from the various sensors, data sources, instruments, and subsystems described herein. For example, processor architecture 104 is suitably configured to obtain and process real-time aircraft status data (e.g., avionics-related data) as needed to generate a graphical synthetic perspective representation of terrain in a primary display region, along with a synthetic perspective view of a designated target location or object. The graphical features and characteristics of a number of exemplary displays are described below with reference to FIGS. 2-7.

In certain embodiments, processor architecture 104 is configured to respond to inertial data obtained by inertial sensors 126 to selectively retrieve terrain data from terrain database 108 or terrain sensor 128, to selectively retrieve navigation data from navigation database 110, and/or to selectively retrieve graphics data corresponding to a selected object, location, or target. Processor architecture 104 can also supply appropriate display commands to display element 106, so that the retrieved terrain, navigation, and object/location data are appropriately displayed on display element 106. Processor architecture 104 may be further configured to receive real-time (or virtually real-time) airspeed, altitude, attitude, waypoint, and/or geographic position data for the aircraft and, based upon that data, generate image rendering display commands associated with the display of terrain.

Display element 106 is used to display various images and data, in both a graphical and a textual format, and to supply visual feedback to the user 130 in response to the user input commands supplied by the user 130 to user interface 102. It will be appreciated that display element 106 may be any one of numerous known displays suitable for rendering image and/or text data in a format viewable by the user 130. Non-limiting examples of such displays include various cathode ray tube (CRT) displays, and various flat panel displays such as, various types of LCD (liquid crystal display), OLED, and TFT (thin film transistor) displays. Display element 106 may additionally be based on a panel mounted display, a HUD projection, or any known technology. In an exemplary embodiment, display element 106 includes a panel display, and display element 106 is suitably configured to receive image rendering display commands from processor architecture 104 and, in response thereto, display element 106 renders a primary display region having a perspective view of terrain corresponding to a flight deck viewpoint. Moreover, display element 106 also renders a synthetic perspective view of the designated object or location in a target-focused manner. To provide a more complete description of the operating method that is implemented by system 100, a general description of exemplary flight displays and various graphical features rendered thereon will be provided below with reference to FIGS. 2-7.

As FIG. 1 shows, processor architecture 104 is in operable communication with the source of weather data 120, TAWS 122, and TCAS 124, and is additionally configured to generate, format, and supply appropriate display commands to display element 106 so that the avionics data, weather data 120, data from TAWS 122, data from TCAS 124, and data from the previously mentioned external systems may also be selectively rendered in graphical form on display element 106. The data from TCAS 124 can include Automatic Dependent Surveillance Broadcast (ADS-B) messages.

Terrain database 108 includes various types of data, including elevation data, representative of the terrain over which the aircraft is flying. The terrain data can be used to generate a three dimensional perspective view of terrain in a manner that appears conformal to the earth. In other words, the display emulates a realistic view of the terrain from the flight deck or cockpit perspective. The data in terrain database 108 can be pre-loaded by external data sources or provided in real-time by terrain sensor 128. Terrain sensor 128 provides real-time terrain data to processor architecture 104 and/or terrain database 108. In one embodiment, terrain data from terrain sensor 128 is used to populate all or part of terrain database 108, while in another embodiment, terrain sensor 128 provides information directly, or through components other than terrain database 108, to processor architecture 104.

In another embodiment, terrain sensor 128 can include visible, low-light TV, infrared, lidar, or radar-type sensors that collect and/or process terrain data. For example, terrain sensor 128 can be a radar sensor that transmits radar pulses and receives reflected echoes, which can be amplified to generate a radar signal. The radar signals can then be processed to generate three-dimensional orthogonal coordinate information having a horizontal coordinate, vertical coordinate, and depth or elevation coordinate. The coordinate information can be stored in terrain database 108 or processed for display on display element 106.

In one embodiment, the terrain data provided to processor architecture 104 is a combination of data from terrain database 108 and terrain sensor 128. For example, processor architecture 104 can be programmed to retrieve certain types of terrain data from terrain database 108 and other certain types of terrain data from terrain sensor 128. In one embodiment, terrain data retrieved from terrain sensor 128 can include moveable terrain, such as mobile buildings and systems. This type of terrain data is better suited for terrain sensor 128 to provide the most up-to-date data available. For example, types of information such as waterbody information and geopolitical boundaries can be provided by terrain database 108. When terrain sensor 128 detects, for example, a waterbody, the existence of such can be confirmed by terrain database 108 and rendered in a particular color such as blue by processor architecture 104.

Navigation database 110 includes various types of navigation-related data stored therein. In preferred embodiments, navigation database 110 is an onboard database that is carried by the aircraft. The navigation-related data include various flight plan related data such as, for example, and without limitation: waypoint location data for geographical waypoints; distances between waypoints; track between waypoints; data related to different airports; navigational aids; obstructions; special use airspace; political boundaries; communication frequencies; and aircraft approach information. In one embodiment, combinations of navigation-related data and terrain data can be displayed. For example, terrain data gathered by terrain sensor 128 and/or terrain database 108 can be displayed with navigation data such as waypoints, airports, etc. from navigation database 110, superimposed thereon.

Although terrain database 108 and navigation database 110 are, for clarity and convenience, shown as being stored separate from processor architecture 104, all or portions of either or both of these databases 108, 110 could be loaded into the onboard RAM 136, stored in ROM 138, or integrally formed as part of processor architecture 104. Terrain database 108 and navigation database 110 could also be part of a device or system that is physically separate from system 100.

Positioning subsystem 111 is suitably configured to obtain position data for the aircraft. In practice, positioning subsystem 111 monitors the current position of the aircraft in real-time, and the real-time position data can be used by one or more other subsystems, processing modules, or equipment on the aircraft (e.g., navigation computer 112, RAAS 114, ILS 116, flight director 118, TAWS 122, or TCAS 124). In certain embodiments, positioning subsystem 111 is realized using global positioning system (GPS) technologies that are commonly deployed in avionics applications. Thus, the position data obtained by positioning subsystem 111 may represent the latitude and longitude of the aircraft in an ongoing and continuously updated manner.

The avionics data that is supplied from inertial sensors 126 includes data representative of the state of the aircraft such as, for example, aircraft speed, altitude, attitude (i.e., pitch and roll), and heading. Inertial sensors 126 can include MEMS-based, ADHRS-related, or any other type of inertial sensor. Inertial sensors 126 may include at least one sensor that is suitably configured to obtain altitude data for the aircraft, where the altitude data represents the current real-time altitude of the aircraft. As understood by those familiar with avionics instruments, the altitude data is preferably updated in a continuous and ongoing manner.

The weather data 120 supplied to processor architecture 104 is representative of at least the location and type of various weather cells. The data supplied from TCAS 124 includes data representative of other aircraft in the vicinity, which may include, for example, speed, direction, altitude, and altitude trend. In a preferred embodiment, processor architecture 104, in response to the TCAS data, supplies appropriate display commands to display element 106 such that a graphic representation of each aircraft in the vicinity is displayed on display element 106. TAWS 122 supplies data representative of the location of terrain that may be a threat to the aircraft. Processor architecture 104, in response to the TAWS data, preferably supplies appropriate display commands to display element 106 such that the potential threat terrain is displayed in various colors depending on the level of threat. For example, red is used for warnings (immediate danger), yellow is used for cautions (possible danger), and green is used for terrain that is not a threat. It will be appreciated that these colors and number of threat levels are merely exemplary, and that other colors and different numbers of threat levels can be provided as a matter of choice.

As was previously alluded to, one or more other external systems (or subsystems) may also provide avionics-related data to processor architecture 104 for display on display element 106. In the depicted embodiment, these external systems include a flight director 118, an instrument landing system (ILS) 116, a runway awareness and advisory system (RAAS) 114, and a navigation computer 112. Flight director 118, as is generally known, supplies command data representative of commands for piloting the aircraft in response to flight crew entered data, or various inertial and avionics data received from external systems. The command data supplied by flight director 118 may be supplied to processor architecture 104 and displayed on display element 106 for use by the user 130, or the data may be supplied to an autopilot (not illustrated). The autopilot, in turn, produces appropriate control signals that cause the aircraft to fly in accordance with the flight crew entered data, or the inertial and avionics data.

ILS 116 is a radio navigation system that provides the aircraft with horizontal and vertical guidance just before and during landing and, at certain fixed points, indicates the distance to the reference point of landing. The system includes ground-based transmitters (not shown) that transmit radio frequency signals. ILS 116 onboard the aircraft receives these signals and supplies appropriate data to the processor for display of, for example, an ILS feather (not shown in FIG. 1) on the display element 106. The ILS feather represents two signals, a localizer signal that is used to provide lateral guidance, and a glide slope signal that is used for vertical guidance.

RAAS 114 provides improved situational awareness to help lower the probability of runway incursions by providing timely aural advisories to the flight crew during taxi, takeoff, final approach, landing and rollout. RAAS 114 uses GPS data to determine aircraft position and compares aircraft position to airport location data stored in navigation database 110. Based on these comparisons, RAAS 114, if necessary, issues appropriate aural advisories. Aural advisories, which may be issued by RAAS 114, inform the user 130, among other things of when the aircraft is approaching a runway, either on the ground or from the air at times such as when the aircraft has entered and is aligned with a runway, when the runway is not long enough for the particular aircraft, the distance remaining to the end of the runway as the aircraft is landing or during a rejected takeoff, when the user 130 inadvertently begins to take off from a taxiway, and when an aircraft has been immobile on a runway for an extended time. During approach, data from sources such as GPS, including RNP and RNAV, can also be considered.

Navigation computer 112 is used, among other things, to allow the user 130 to program a flight plan from one destination to another. Navigation computer 112 may be in operable communication with flight director 118. As was mentioned above, flight director 118 may be used to automatically fly, or assist the user 130 in flying, the programmed route. Navigation computer 112 is in operable communication with various databases including, for example, terrain database 108, and navigation database 110. Processor architecture 104 may receive the programmed flight plan data from navigation computer 112 and cause the programmed flight plan, or at least portions thereof, to be displayed on display element 106.

ATC datalink 113 is utilized to provide air traffic control data to system 100, preferably in compliance with known standards and specifications. Using ATC datalink, processor architecture 104 can receive air traffic control data from ground based air traffic controller stations and equipment. In turn, system 100 can utilize such air traffic control data as needed.

In operation, a flight deck display system as described herein is suitably configured to process current status data for the host aircraft and generate a primary flight display having graphical features and characteristics that are influenced by the current status data. The current status data for a given aircraft may include, without limitation: flight plan data; geographic position data; altitude data; attitude (roll and pitch) data; terrain data; or the like. In response to the current status data, the display system can generate and display an appropriately formatted image on its display element, such as a synthetic perspective view of terrain along with graphical representations of various instrument panel elements.

Preferred embodiments of the flight deck display system are also suitably configured to process the current status data for the aircraft, along with graphics data corresponding to a selected or designated object, location, or target, to generate a secondary display that keeps the designated target in its field of view at all times. In certain embodiments, the secondary display includes a synthetic perspective view of the designated target as viewed from a selected viewpoint (such as the host aircraft). The secondary synthetic perspective display enables the pilot or crew to view the designated object or location of interest at all times regardless of whether that object or location is also being displayed on the primary flight display.

Figure 2:
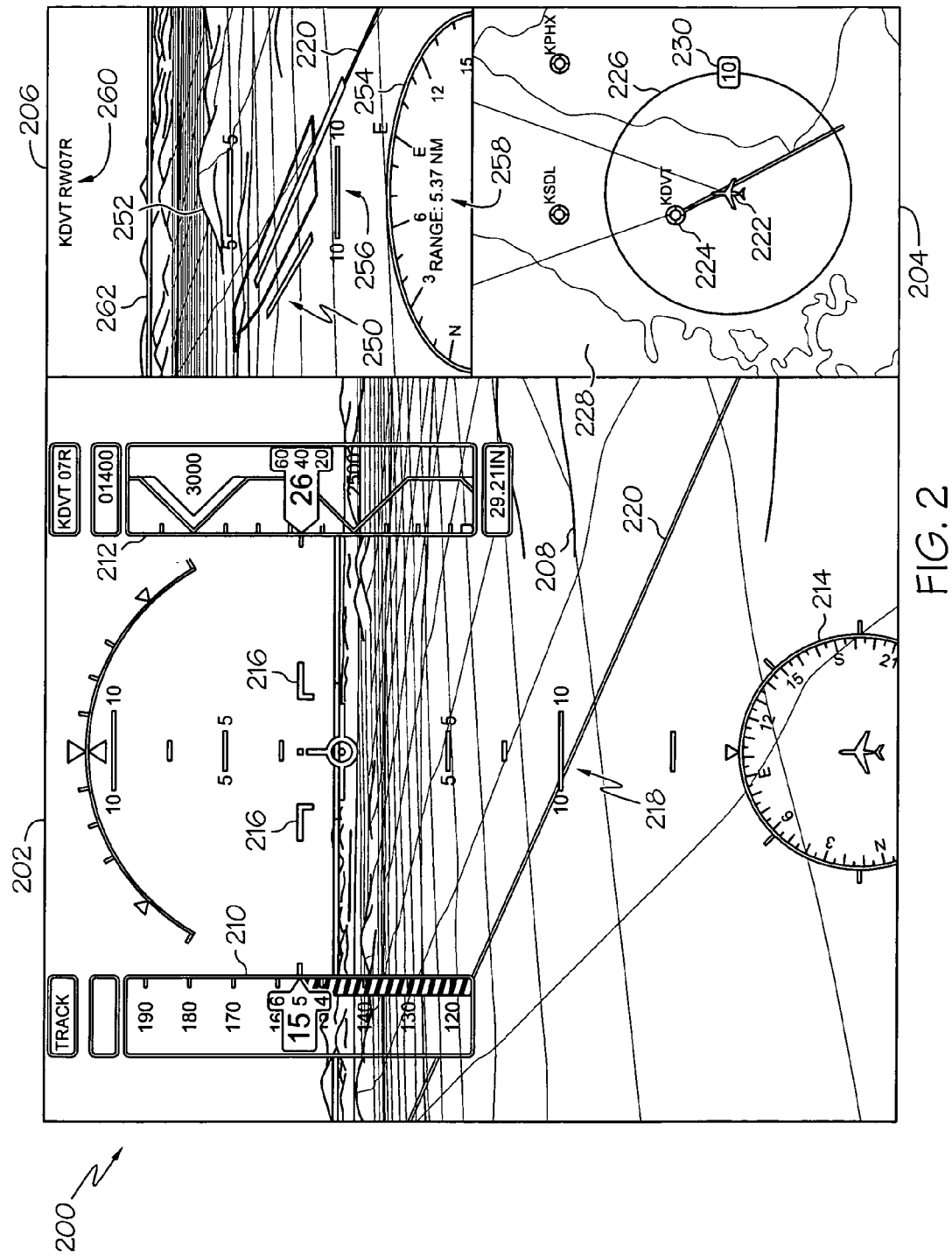
FIG. 2 depicts components of an exemplary flight deck display, including a primary flight display, a lateral map display, and a synthetic perspective view of a designated target.

FIG. 2 depicts components of an exemplary flight deck display 200, which includes a primary flight display 202, a lateral map display 204, and a secondary display 206. Primary flight display 202, lateral map display 204, and secondary display 206 can be rendered on one or more physically distinct display elements. In certain embodiments, primary flight display 202, lateral map display 204, and secondary display 206 represent defined sections or windows rendered on a single display element. Although not a requirement, the general positioning, size, boundaries, and orientation of primary flight display 202, lateral map display 204, and secondary display 206 within flight deck display 200 remain fixed during operation.

It should be appreciated that flight deck display 200 as depicted in FIG. 2 represents the state of a dynamic display frozen at one particular time, and that the display element hardware can be continuously refreshed in response to the current flight status, environmental conditions, location of the aircraft, etc. The illustrated primary flight display 202 includes several features that are graphically rendered. These features include, without limitation: a synthetic perspective view of terrain 208 that is based on the terrain data being processed by the system; an airspeed tape 210; an altimeter tape 212; a compass or horizontal situation indicator 214; an aircraft reference marker 216; a pitch ladder scale 218; and an approach course indicator 220 that indicates the desired approach course to the runway. In practice, primary flight display 202 may include any number of additional graphical elements, e.g., flight data, numerical information, pilot guidance elements, trend data, and the like. For the sake of clarity, simplicity, and brevity, such additional graphical elements are not shown or described here.

Terrain 208 is rendered in a perspective or three dimensional view that corresponds to a flight deck (cockpit) viewpoint. In other words, terrain 208 is displayed in a graphical manner that simulates the vantage point of a person in the cockpit of the aircraft. Thus, features of terrain 208 are displayed in a conformal manner, relative to the earth. For example, the relative elevations and altitudes of features in terrain 208 are displayed in a virtual manner that emulates reality. Moreover, as the aircraft navigates (e.g., turns, ascends, descends, rolls, etc.), the graphical representation of terrain 208 and other features of the perspective display can shift to provide a continuously updated virtual representation for the flight crew. It should be appreciated that the perspective view associated with primary flight display 202 need not always include a perspective view of terrain 208. For example, in the absence of terrain data, the perspective view of the display may appear flat, blank, or otherwise void of conformal terrain graphics.

Lateral map display 204 is concurrently rendered with primary flight display 202, preferably in a real-time and synchronized manner. Lateral map display 204 can display information based on data from a number of sources, including the various sensors, sources, and subsystems described above with reference to FIG. 1. The illustrated lateral map display 204 includes a top-view aircraft symbol 222, an airport symbol 224 corresponding to a designated location (e.g., an airport), and one or more range rings 226. Lateral map display 204 also preferably includes various map features including, but not limited to, a lateral two-dimensional view of terrain 228 below the flight plan, political boundaries, and navigation aids. Range rings 226 may be used to indicate sequential ranges, such as fixed distance or time ranges needed to travel from the current position indicated by the top-view aircraft symbol 222 to another position on the terrain 228, or any other information that may be useful to a pilot. In the illustrated embodiment, the range rings 226 indicate distances from the aircraft symbol 222. The range ring 226 includes a range indicator 230, which displays the lateral distance from the present position to the position that corresponds to the range ring 226 (e.g., 10 nautical miles).

The depicted state of lateral map display 204 corresponds to the depicted state of primary flight display 202 in FIG. 2. In other words, the aircraft is descending and approaching the airport labeled KDVT, which is rendered on lateral map display 204 as a corresponding airport symbol 224. The combination of the synthetic perspective view of primary flight display 202 and lateral map display 204 provides useful and intuitive information to the flight crew in a simple graphical manner. FIG. 2 depicts a situation where the location KDVT (which is visible in lateral map display 204) is outside the field of view of primary flight display 202.

Secondary display 206 is concurrently rendered with primary flight display 202, preferably in a real-time and synchronized manner. In practice, the content of secondary display 206 is influenced by the aircraft status data, the terrain data, and other graphics data being processed by the onboard systems. Secondary display 206 includes a synthetic perspective view of a designated or selected target 250. It should be appreciated that designated target 250 could represent any object, location, or item of interest, including tangible or intangible items, features, or elements. In this regard, designated target 250 might be or include, without limitation: an airport; a runway; a waypoint for the aircraft; a physical landmark such as a road or a bridge; a natural landmark such as a river or a mountain; a building; a neighboring aircraft; a ground-based vehicle; a location corresponding to a navigation aid; a location corresponding to a navigation beacon; a location corresponding to designated GPS data; a location corresponding to designated latitude, longitude, and altitude coordinates; a location corresponding to designated latitude and longitude coordinates; a weather-related object; an airspace area; and an obstacle; etc. Notably, the designated target 250 shown in FIG. 2 corresponds to the airport labeled KDVT, and designated target 250 includes the runway for the host aircraft.

In addition to designated target 250, secondary display 206 may contain other features that are graphically rendered. These features include, without limitation: a synthetic perspective view of terrain 252 proximate designated target 250; a compass or horizontal situation indicator 254; a graphical pitch scale 256; a graphical range element 258; and a graphical label element 260. In practice, secondary display 206 may include any number of additional graphical elements, e.g., flight data, numerical information, pilot guidance elements, trend data, and the like. For the sake of clarity, simplicity, and brevity, such additional graphical elements are not shown or described here.

The graphics data associated with designated target 250 may be provided by one or more sources, such as the sources of terrain data. Notably, designated target 250 is displayed in a manner that corresponds to a designated viewpoint or reference point. For example, the designated viewpoint may represent or correspond to: a cockpit view (or any view from a location on the host aircraft); any third person view; a stationary reference point; or a non-stationary reference point. In preferred embodiments, secondary display 206 is a target-focused or target-locked display in that it keeps designated target 250 within its field of view at all times. Thus, designated target 250 can be displayed regardless of the current position and flight status of the host aircraft. FIG. 2 depicts a situation where designated target 250 is clearly displayed on secondary display 206 even though it is outside the field of view of primary flight display 202. In certain embodiments, approach course indicator 220 might also be displayed on secondary display 206, possibly in a manner such that the viewer can easily distinguish that it is somehow connected or linked to its counterpart rendered in primary flight display 202.

Designated target 250 may be rendered on the display element in a visually highlighted, distinct, or eye-catching manner that enables the crew member to quickly and easily locate designated target 250. For example, a target view of a neighboring aircraft may show other aircraft, or the target aircraft might be displayed in a small size on secondary display 206. Under such conditions, it would be desirable to highlight the designated target to make it more noticeable. In this regard, the highlighting could be realized using a glowing effect, a colored ring or border surrounding the designated target, or by using any of the visually distinguishable characteristics mentioned herein.

The system could also be configured to allow zooming in and out on the designated target, if desired. In this regard, the magnification of the designated target (as rendered on secondary display 206) can be adjusted as necessary. For example, if a traffic target is far away from the host aircraft, then it would normally appear as a very small object on the display. Under such conditions, the system could magnify the secondary display (or the designated target within the secondary display) by an appropriate amount for the size of the secondary display. The zoom adjustment may be automatically controlled by the display system in accordance with predetermined display rules and preferences, or it may be controlled by the user. If magnification (or shrinkage) is initiated, the amount of magnification (or shrinkage) could be graphically indicated in an appropriate manner. For example, the secondary display might include a label that indicates the amount of zoom, e.g., 2× or 5×.

Designated target 250 and terrain 252 are rendered in a perspective or three dimensional view that corresponds to the designated viewpoint. Moreover, the features of designated target 250 and terrain 252 are preferably displayed in a conformal manner, relative to the earth. Thus, as the aircraft navigates (e.g., turns, ascends, descends, rolls, etc.), the graphical representation of designated target 250, terrain 252, and other rendered features of secondary display 206 can shift to provide a continuously updated virtual representation for the flight crew.

Horizontal situation indicator 254 indicates the orientation of designated target 250 relative to a reference coordinate system (e.g., North, South, East, West). For this particular embodiment, horizontal situation indicator 254 indicates the direction of the view rendered in secondary display 206. The direction shown on horizontal situation indicator 254 need not be the same as that depicted on horizontal situation indicator 214 because the two views might differ.

Pitch scale 256 includes a number of parallel marks and/or alphanumeric characters that indicate the real-time pitch of the aircraft using any convenient scale. Zero pitch on pitch scale 256 corresponds to a zero pitch reference line (sometimes referred to as the horizon line) 262. In other words, zero pitch reference line 262 may be considered to be an extension of pitch scale 256. Markings of pitch scale 256 that appear above zero pitch reference line 262 correspond to positive pitch of the aircraft, and markings of pitch scale 256 that appear below zero pitch reference line 262 correspond to negative pitch of the aircraft.

Graphical range element 258 indicates the distance between the host aircraft and designated target 250. The distance can be expressed relative to any convenient scale and in appropriate units, such as nautical miles. FIG. 2 depicts a state where graphical range element 258 indicates a range of 5.37 nautical miles to designated target 250.

Graphical label element 260 can be used to convey the alphanumeric name of designated target 250. For example, waypoints, navigation aids, landmarks, airports, and other locations might be given unique names that are recognized in the aviation industry. Indeed, graphical label element 260 in FIG. 2 includes the descriptor KDVT RW07R, which indicates the airport and runway for the host aircraft. It should be appreciated that graphical label element 260 could also be used to convey GPS coordinates, user-entered information, or any data that might be desired.

Figure 3:
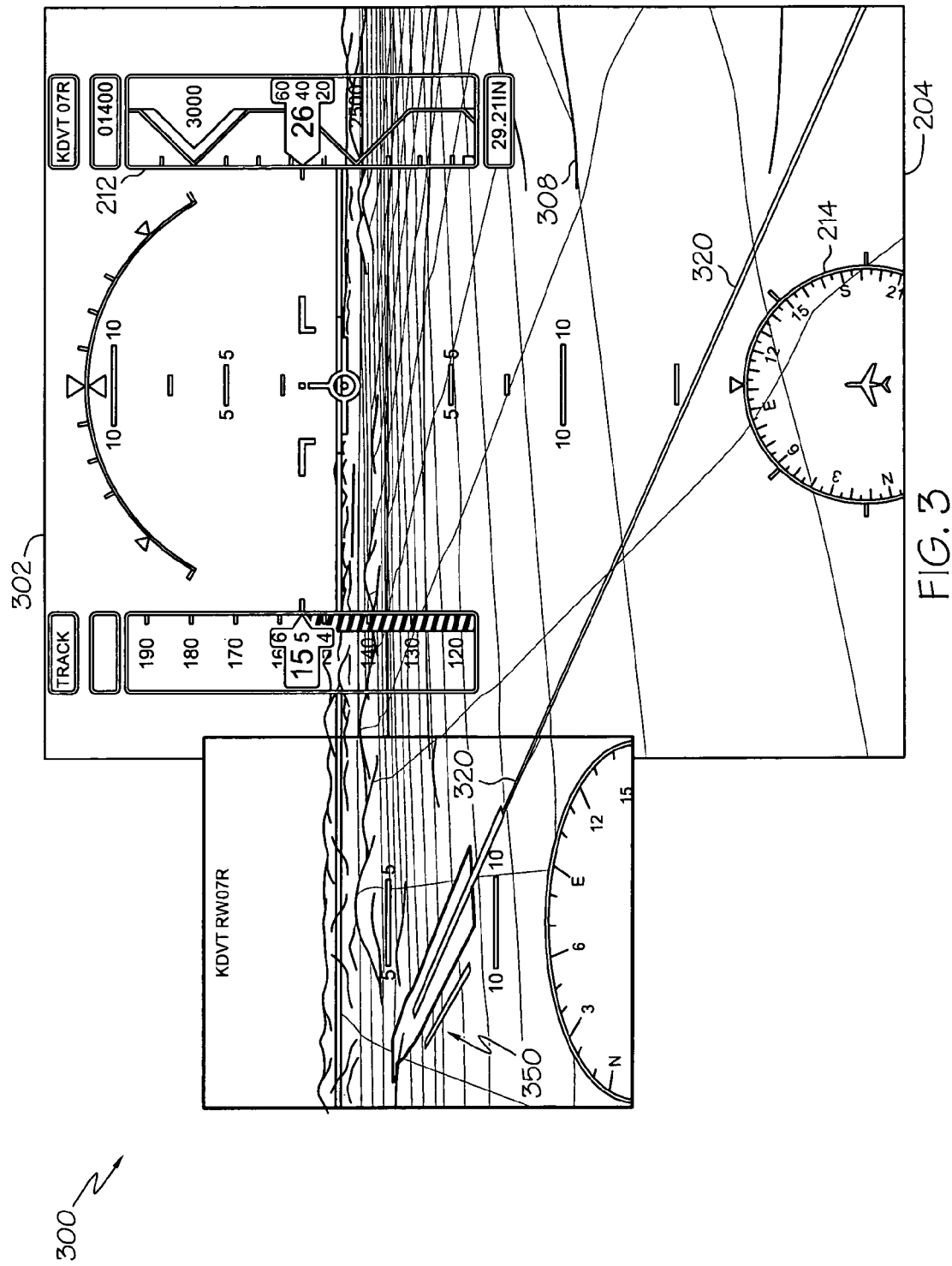
FIG. 3 depicts components of an exemplary flight deck display, including a primary flight display and a synthetic perspective view of a designated target that is superimposed over a portion of the primary flight display.

Flight deck display 200 utilizes predetermined and fixed display areas for primary flight display 202, lateral map display 204, and secondary display 206. In other words, the size and relative positioning of primary flight display 202, lateral map display 204, and secondary display 206 remain as shown in FIG. 2 during operation of the host aircraft and regardless of the content displayed therein. In contrast, FIG. 3 depicts components of an exemplary flight deck display 300 that includes a primary flight display 302 and a secondary display 306 that is superimposed over a portion of primary flight display 302. In this embodiment, secondary display 306 can be dynamically repositioned within primary flight display 302 as needed during operation. The general characteristics and features of primary flight display 302 and secondary display 306 were described above in the context of flight deck display 200, and common characteristics, features, and aspects will not be redundantly described here for flight deck display 300.

Notably, flight deck display 300 need not provide a reserved or devoted portion of the display element screen for rendering of secondary display 306. Rather, secondary display 306 can be rendered in any desired location of primary flight display 302. In preferred embodiments, secondary display 306 is rendered in a location of primary flight display 302 that indicates, corresponds to, or otherwise suggests the actual location of the designated target 350 in a conformal or quasi-conformal manner. For example, the synthetic perspective view of designated target 350 (e.g., a runway) is rendered such that its displayed position is indicative of its true location relative to the synthetic perspective view of terrain 308 that is rendered in primary flight display 302. FIG. 3 demonstrates this feature—secondary display 306 is rendered as a superimposed window at the left side of primary flight display 302 because designated target 350 is actually located on the port side of the aircraft. For the conditions depicted in FIG. 3, designated target 350 is not visible in primary flight display 302 due to the limited field of view of primary flight display 302. Nonetheless, the inclusion of secondary display 306 at the left side of primary flight display 302 provides some situational awareness of the true location of designated target 350 relative to the terrain features rendered in primary flight display 302. In this regard, if designated target 350 is actually located on the starboard side of the aircraft, then secondary display 306 would be rendered on the right side of primary flight display 302.

FIG. 3 depicts an embodiment where the synthetic perspective view of designated target 350 is superimposed over a section of terrain 308. To improve clarity and reduce clutter on flight deck display 300, secondary display 306 can completely obscure the portion of primary flight display 302 over which it is superimposed. Alternatively, secondary display 306 could be rendered with some level of transparency such that the underlying terrain 308 remains visible and "blended" with the content of secondary display 306. In other embodiments, flight deck display 300 may reserve some display screen area for secondary display 306, such that primary flight display 302 need not be obscured by secondary display 306. For example, flight deck display 300 might include a border surrounding primary flight display 302, where the border is reserved for rendering of secondary display 306. As another example, flight deck display 300 might include a limited number of reserved display areas (e.g., four) for rendering of secondary display 306. In this regard, these reserved display areas could indicate whether the designated target is located on the port side, the starboard side, behind, or ahead of the host aircraft. Moreover, as shown in FIG. 3, an approach course indicator 320 could be rendered in both the primary flight display 302 and secondary display 306. In certain embodiments, primary flight display 302 and secondary display 306 can be rendered in an appropriate manner such that approach course indicator 320 is displayed as a continuous (or substantially continuous) line or graphical element that extends into secondary display 306. Such a continuous display enhanced the situational awareness of the pilot and provides a more intuitive and easy-to-interpret display.

Figure 4:
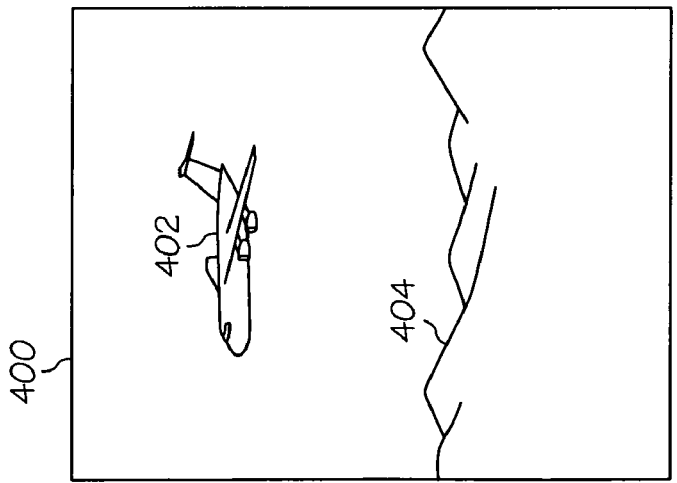

The secondary displays depicted in FIG. 2 and FIG. 3 include a synthetic perspective view of something other than the host aircraft, as viewed from a location on the host aircraft. Preferred embodiments might use this approach to simulate how a person might want to keep his or her eye on a location or object that is visible from the cockpit (which could provide up to a 360-degree view). Alternatively, a secondary display can be utilized to render a synthetic perspective view of the host aircraft itself, where the designated viewpoint corresponds to a third person view of the host aircraft. In this regard, FIG. 4 depicts a secondary display 400 that includes a synthetic perspective view of the host aircraft 402 (i.e., the designated target) as viewed from another aircraft. Secondary display 400 also includes a synthetic perspective view of terrain 404. Notably, secondary display 400 includes a third person view of host aircraft 402 from the perspective of a non-stationary reference point (the other aircraft). In practice, the display system onboard the host aircraft can process status and position data for the other aircraft (which might correspond to TCAS data and/or ADS-B data), along with terrain data, to generate the synthetic perspective view for secondary display 400. Certain embodiments may provide a user interface feature that allows a user onboard the host aircraft to switch the viewpoint perspective for secondary display 400—the designated target can be the host aircraft as viewed from the neighboring aircraft, or the neighboring aircraft as viewed from the host aircraft.

Figure 5:
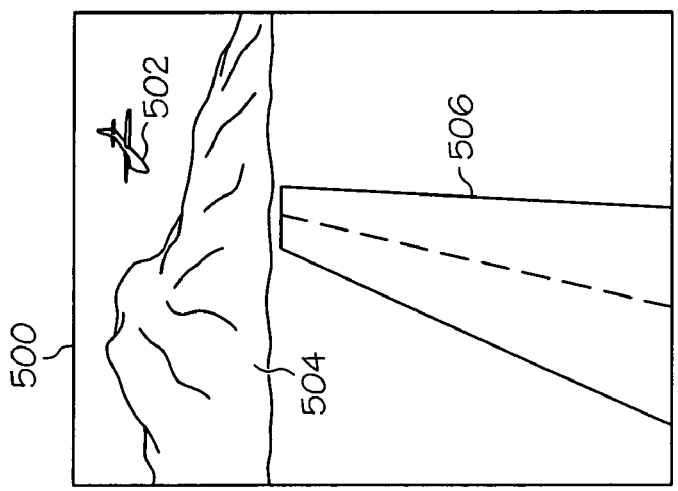

FIG. 5 depicts yet another secondary display 500 that includes a synthetic perspective view of the host aircraft 502 (i.e., the designated target) as viewed from the perspective of a stationary reference point. Here, the stationary reference point corresponds to a location at the airport. Secondary display 500 also includes a synthetic perspective view of terrain 504 and a runway 506. Certain embodiments may provide a user interface feature that allows a user onboard the host aircraft to switch the viewpoint perspective for secondary display 500—the designated target can be the host aircraft as viewed from the stationary reference point, or the stationary reference point as viewed from the host aircraft.

Figure 6:
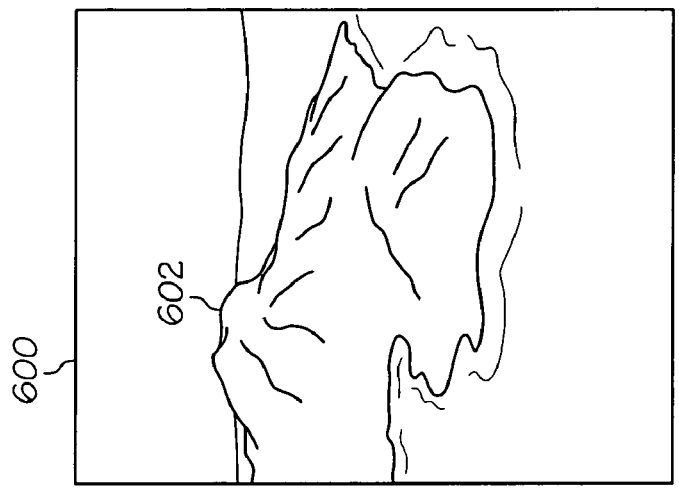
FIGS. 4-6 are graphical representations of synthetic perspective views of designated targets.
Figure 7:
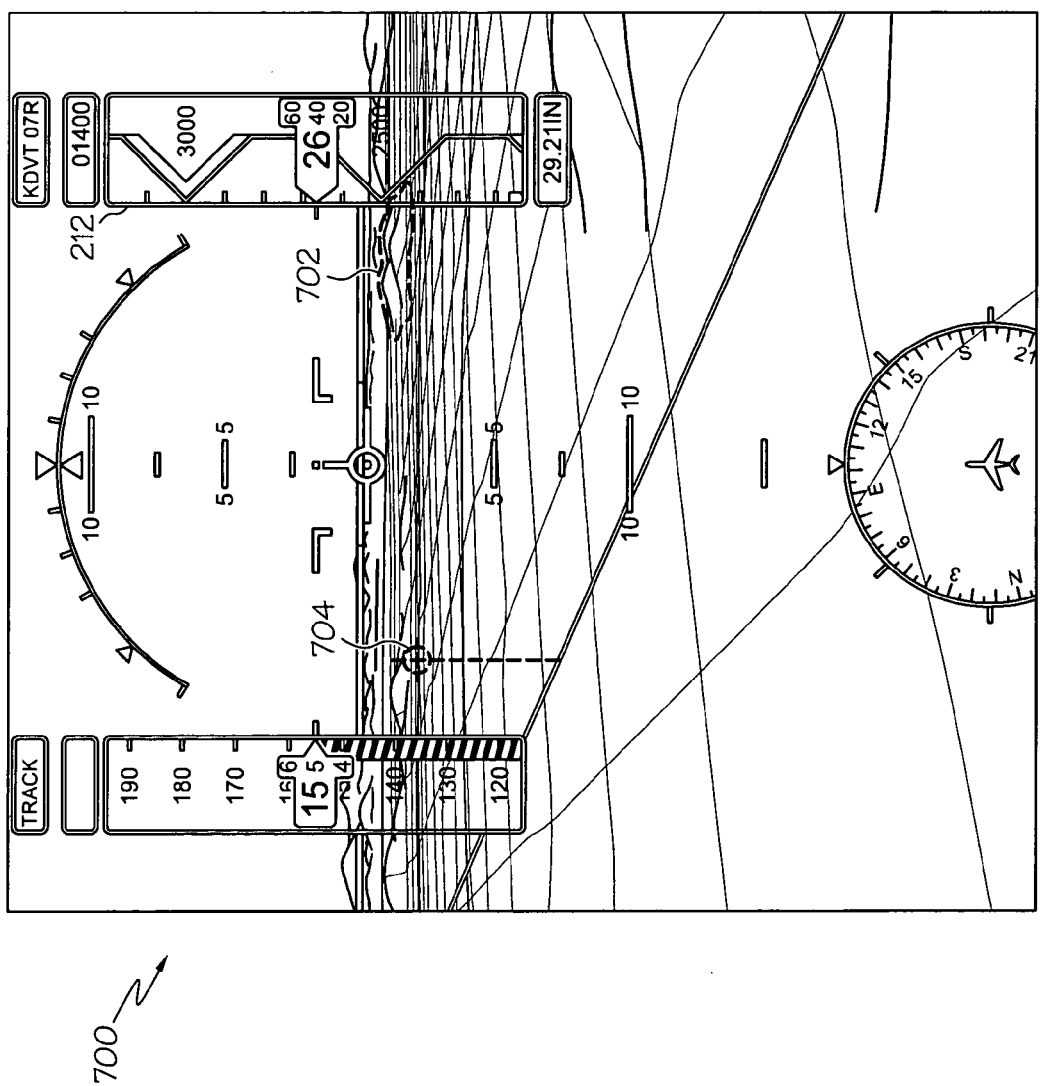
FIG. 7 is a graphical representation of a primary flight display having interactive graphical elements rendered thereon.

As mentioned previously, the designated target contained in a secondary display may be any object, location, or visible feature. For example, FIG. 6 depicts yet another secondary display 600 that includes a synthetic perspective view of a terrain feature, e.g., a mountain 602. Secondary display 600 corresponds to a view from the cockpit of the host aircraft. Referring also to FIG. 7, mountain 602 corresponds to a magnified rendering of a mountain 702 that is also rendered in a primary flight display 700. Accordingly, a secondary display can be utilized to isolate, focus, or zoom on an item that is also contained in a primary flight display. In other words, a secondary display can provide a redundant display of a designated target.

In certain embodiments, the onboard system can include one or more user interface elements that enable user selection and/or switching of the designated target that is rendered in a secondary display. The user interface elements may include, without limitation: a keyboard; a keypad; a mouse or other graphical user interface pointing system; a voice command system; buttons; knobs; interactive graphical elements rendered on a display element; or the like. In this regard, FIG. 7 is a graphical representation of a primary flight display 700 having interactive graphical elements rendered thereon. The interactive graphical elements correspond to candidate targets that can be selected by the user. In particular, primary flight display 700 includes mountain 702 and a waypoint 704, which are rendered as interactive graphical elements. The interactive nature of these and other graphical elements can be indicated using visually distinguishable characteristics (as indicated by the dashed lines in FIG. 7). In this regard, the different visually distinguishable characteristics may correspond to any of the following characteristics, individually or in any combination thereof: different colors; different brightness; different transparency levels; different translucency levels; different line patterns; different line thickness; different flicker patterns; different focus levels; different sharpness levels; and different clarity levels. In practice, the pilot or crew member can manipulate a cursor or pointer to an interactive graphical element on primary flight display 700 to select the corresponding item for display as the designated target on the secondary display. Such user interaction with an interactive graphical element results in the generation of a suitable user interface command that causes the system to render the designated target in the secondary display. For this example, secondary display 600 (see FIG. 6) can be generated upon user selection of mountain 702 (see FIG. 7).

Alternatively (or additionally), the onboard system and processor architecture could be configured to automatically identify the selected object/location to be rendered in the secondary display based upon real-time aircraft status data and predetermined selection criteria. For example, if the system detects that the host aircraft is on approach, then it may automatically identify the airport or runway as the designated target, and thereafter render a synthetic perspective view of the airport or runway in the secondary display. As another example, if the system detects air traffic within close proximity to the host aircraft, then it may automatically identify the neighboring aircraft as the designated target, and thereafter render a synthetic perspective view of the neighboring aircraft in the secondary display.

Figure 8:
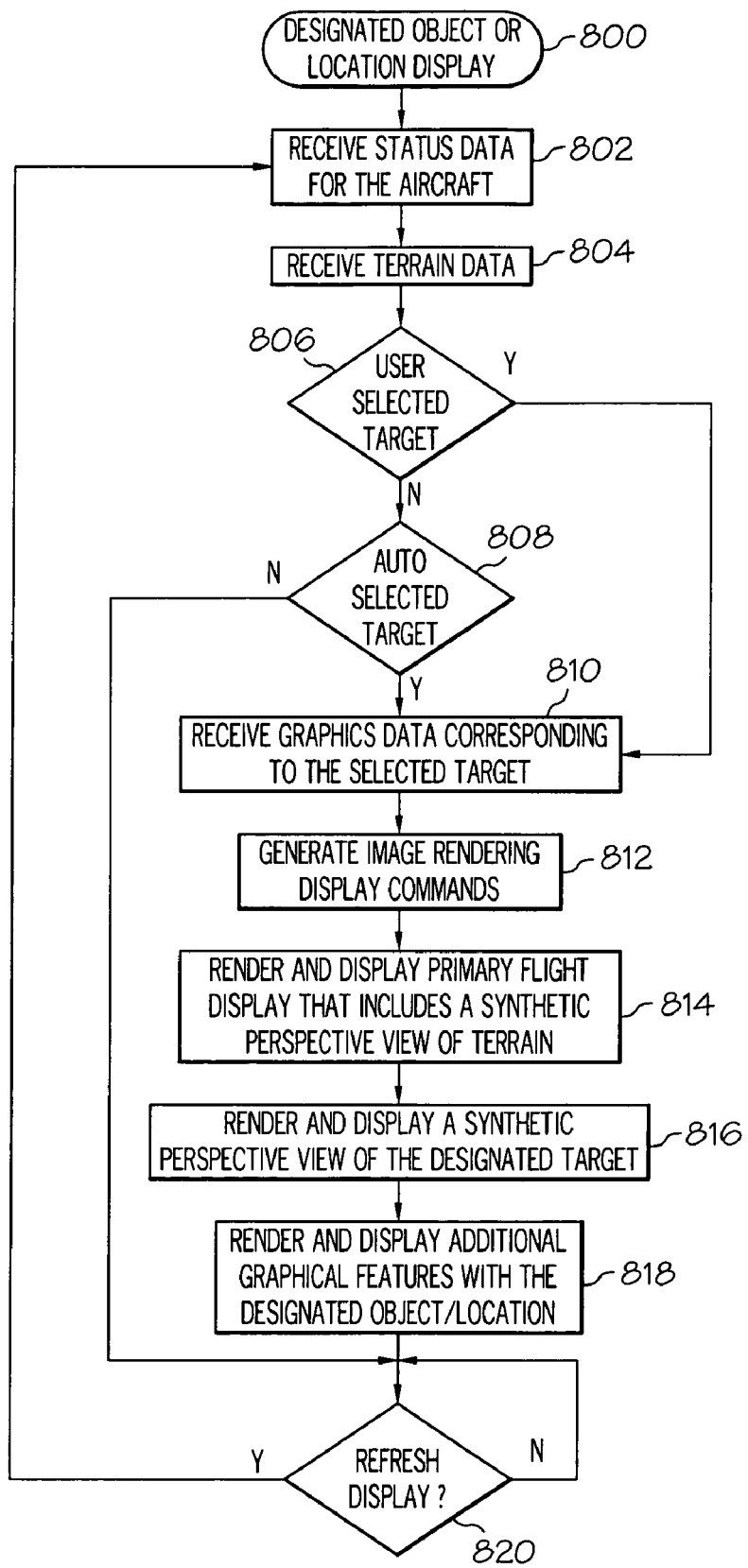
FIG. 8 is a flow chart that illustrates an exemplary embodiment of a process for displaying a designated object, location, or target.

In practice, displays having the features and elements described above can be generated and dynamically updated and refreshed in real-time (or substantially real-time) during flight. In this regard, FIG. 8 is a flow chart that illustrates an exemplary embodiment of a process 800 for displaying a designated object, location, or target. The various tasks performed in connection with process 800 may be performed by software, hardware, firmware, or any combination thereof. For illustrative purposes, the following description of process 800 may refer to elements mentioned above in connection with FIGS. 1-7. In practice, portions of process 800 may be performed by different elements of the described system, e.g., sensors, a processor, a graphics engine, a user interface element, or a display element. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein.

Process 800 can be performed in a virtually continuous manner at a relatively high refresh rate. For example, an iteration of process 800 could be performed at a rate of 12-40 Hz (or higher) such that the flight displays will be updated in real-time or substantially real time in a dynamic manner. This particular embodiment of process 800 receives the current status data for the host aircraft (task 802). This current status data may include, among other items: attitude data (e.g., real-time pitch data and real-time roll data); altitude data; airspeed data; fuel status data; performance capability data; neighboring aircraft status data received by the host aircraft; position data (latitude and longitude); phase of flight information; auto-pilot mode or status data; threats and alerts information (e.g., air traffic, obstacles, terrain); threat prediction data; weather data; gear and flap position data; trim state of other control surfaces; time data; flight deck display configuration data; and the like. Process 800 also receives, obtains, or accesses terrain data corresponding to terrain proximate the aircraft (task 804). As mentioned above, this terrain data might represent the current image of the terrain as perceived from the cockpit view. The terrain data may also represent an image of terrain from a different perspective, e.g., a third person view of the host aircraft, or a non-cockpit view.

In certain embodiments, process 800 can accommodate user-selected targets. Thus, if process 800 obtains a user interface command that represents a user-entered selection of a designated target (query task 806), then it will proceed to generate a secondary display that contains a synthetic perspective view of the user-selected target. In some embodiments, process 800 can accommodate the automatic selection of targets. Thus, if process 800 obtains a command that represents an automated selection of a designated target (query task 808), then it will proceed to generate a secondary display that contains a synthetic perspective view of the automatically selected target. If process 800 detects no designated target for rendering in the secondary display, then process 800 may exit or proceed to a query task 820 (described below).

Once a designated target has been selected, process 800 receives, accesses, or otherwise obtains the relevant aircraft status data, terrain data, and graphics data corresponding to the designated target (task 810). The current set of data is then processed in an appropriate manner to generate applicable image rendering display commands that correspond to the primary flight display and the secondary display for the aircraft (task 812). The image rendering display commands are based upon or otherwise influenced by the current data—the graphical display characteristics of the primary flight display and the secondary display are dependent upon the current status data, including the terrain data and the aircraft data. The image rendering display commands are then used to control the rendering of the primary flight display (task 814) and to control the rendering and display of a synthetic perspective view of the designated target in the secondary display (task 816). In certain embodiments, the image rendering display commands are also used to control the rendering of additional graphical features along with the designated target (task 818). Such additional graphical features were described above with reference to secondary display 206 (see FIG. 2).

If it is time to refresh the display (query task 820), then process 800 leads back to task 802 to obtain the most current data. If not, then the current states of the primary flight display and the secondary display are maintained. The relatively high refresh rate of process 800 results in a relatively seamless and immediate updating of the display. Thus, process 800 is iteratively repeated to update the graphical representations of the terrain, the designated target, and other graphical elements of the primary flight display and the secondary display. In practice, process 800 can be repeated indefinitely and at any practical rate to support continuous and dynamic updating and refreshing of the displays. Frequent updating of the displays enables the flight crew to obtain and respond to the current flight situation in virtually real-time.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A flight deck display system for an aircraft, the system comprising:
   a processor architecture configured to receive real-time aircraft status data for the aircraft and graphics data corresponding to a selected object/location, and configured to generate image rendering display commands that are influenced by the aircraft status data and the graphics data; and
   a display element that receives the image rendering display commands and, in response thereto, renders a primary flight display and a secondary display that is separate and distinct from the primary flight display, the primary flight display including a synthetic perspective view as depicted from a forward-looking cockpit view of the aircraft, and the secondary display including a real-time synthetic perspective view of the selected object/location corresponding to a designated viewpoint from the aircraft;
   wherein the secondary display keeps the selected object/location in its field of view, regardless of whether the selected object/location is also being displayed on the primary flight display.

2. The flight deck display system of claim 1, wherein the designated viewpoint represents a cockpit view.

3. The flight deck display system of claim 1, wherein the display element receives the image rendering display commands and, in response thereto, renders a real-time synthetic perspective view of terrain proximate the selected object/location.

4. The flight deck display system of claim 1, wherein the selected object/location is selected from the group consisting of: an airport for the aircraft; a runway for the aircraft; a waypoint for the aircraft; a physical landmark; a natural landmark; a building; a neighboring aircraft; a ground-based vehicle; a location corresponding to a navigation aid; a location corresponding to a navigation beacon; a location corresponding to designated GPS data; a location corresponding to designated latitude and longitude coordinates; a location corresponding to designated latitude, longitude, and altitude coordinates; a weather-related object; an airspace area; and an obstacle.

5. The flight deck display system of claim 1, further comprising a user interface element coupled to the processor architecture, the user interface element enabling user selection of the selected object/location.

6. The flight deck display system of claim 1, wherein the processor architecture is configured to automatically identify the selected object/location based upon the real-time aircraft status data and predetermined selection criteria.

7. The flight deck display system of claim 1, wherein the display element renders the secondary display on the right side of the primary flight display when the selected object/location is located on the starboard side of the aircraft, and the display element renders the secondary display on the left side of the primary flight display when the selected object/location is located on the port side of the aircraft.

8. The flight deck display system of claim 1, wherein the selected object/location is rendered on the display element in a visually highlighted manner.

9. A method for displaying information on a flight deck display element of an aircraft, the method comprising:
receiving aircraft status data for the aircraft;
receiving terrain data corresponding to terrain proximate the aircraft;
rendering, in response to the aircraft status data and the terrain data, a primary flight display on the flight deck display element, wherein the primary flight display comprises a synthetic perspective view of terrain that is based on the terrain data, and wherein the synthetic perspective view of terrain corresponds to a forward-looking flight deck viewpoint; and
rendering, in a portion of the primary flight display, a synthetic perspective view of a designated target as depicted from the aircraft, wherein the synthetic perspective view of the designated target is distinct and separate from the synthetic perspective view of terrain, and wherein the synthetic perspective view of the designated target remains displayed on the flight deck display element regardless of whether the designated target is visible from the forward-looking flight deck viewpoint.

10. The method of claim 9, wherein the synthetic perspective view of the designated target is superimposed over a section of the synthetic perspective view of terrain.

11. The method of claim 9, wherein the designated target is selected from the group consisting of: an airport for the aircraft; a runway for the aircraft; a waypoint for the aircraft; a physical landmark; a natural landmark; a building; a neighboring aircraft; a ground-based vehicle; a location corresponding to a navigation aid; a location corresponding to a navigation beacon; a location corresponding to designated GPS data; a location corresponding to designated latitude and longitude coordinates; a location corresponding to designated latitude, longitude, and altitude coordinates; a weather-related object; an airspace area; and an obstacle.

12. The method of claim 9, wherein the synthetic perspective view of the designated target is rendered in a location of the primary flight display that indicates the actual location of the designated target relative to the synthetic perspective view of terrain.

13. A method for displaying information on a flight deck display element of an aircraft, the method comprising:
obtaining a user interface command that represents a user-entered selection of a designated target;
accessing aircraft status data for the aircraft, terrain data corresponding to terrain proximate the designated target, and graphics data corresponding to the designated target;
rendering a primary flight display in accordance with the aircraft status data, the terrain data, and the graphics data, the primary flight display including a synthetic perspective view as depicted from a forward-looking cockpit view of the aircraft; and
rendering a target-focused display on the flight deck display element as a separate and distinct display from the primary flight display, the target-focused display comprising a real-time synthetic perspective view of the designated target and the terrain proximate the designated target, wherein content of the target-focused display is influenced by the aircraft status data, the terrain data, and the graphics data, wherein the designated target remains displayed in the target-focused display regardless of whether the designated target also appears in the primary flight display.

14. The method of claim 13, wherein the real-time synthetic perspective view represents a view from the aircraft.

15. The method of claim 13, wherein the designated target is selected from the group consisting of: an airport for the aircraft; a runway for the aircraft; a waypoint for the aircraft; a physical landmark; a natural landmark; a building; a neighboring aircraft; a ground-based vehicle; a location corresponding to a navigation aid; a location corresponding to a navigation beacon; a location corresponding to designated GPS data; a location corresponding to designated latitude and longitude coordinates; a location corresponding to designated latitude, longitude, and altitude coordinates; a weather-related object; an airspace area; and an obstacle.

16. The method of claim 13, further comprising:
displaying interactive graphical elements corresponding to candidate targets; and
generating the user interface command in response to user interaction with the interactive graphical element corresponding to the designated target.

17. The method of claim 13, further comprising rendering a graphical range element on the target-focused display, the graphical range element indicating distance between the aircraft and the designated target.

18. The method of claim 13, further comprising rendering a graphical label element on the target-focused display, the graphical label conveying an alphanumeric name of the designated target.

19. The method of claim 13, further comprising rendering a graphical pitch scale on the target-focused display, the graphical pitch scale indicating real-time pitch of the aircraft.

20. The method of claim 13, further comprising adjusting magnification of the real-time synthetic perspective view of the designated target.

* * * * *